(12) United States Patent
Matsuzaki et al.

(10) Patent No.: US 7,388,625 B2
(45) Date of Patent: Jun. 17, 2008

(54) THIN-FILM TRANSISTOR ARRAY SUBSTRATE AND LIQUID CRYSTAL DISPLAY DEVICE

(75) Inventors: Tadahiro Matsuzaki, Tokyo (JP); Kenji Sera, Tokyo (JP)

(73) Assignee: NEC Corporation (JP)

( * ) Notice: Subject to any disclaimer, the term of this patent is extended or adjusted under 35 U.S.C. 154(b) by 362 days.

(21) Appl. No.: 11/313,955

(22) Filed: Dec. 22, 2005

(65) Prior Publication Data
US 2006/0132667 A1 Jun. 22, 2006

(30) Foreign Application Priority Data
Dec. 22, 2004 (JP) ............... 2004-372232

(51) Int. Cl.
*G02F 1/136* (2006.01)
(52) U.S. Cl. ............... 349/44; 349/39; 349/56; 349/122; 349/139
(58) Field of Classification Search ............... 349/39, 349/41, 42, 44, 56, 122, 139, 193, 187
See application file for complete search history.

(56) References Cited

U.S. PATENT DOCUMENTS

| | | | |
|---|---|---|---|
| 5,331,447 A * | 7/1994 | Someya et al. ............... 349/54 |
| 6,175,393 B1 * | 1/2001 | Ban et al. ............... 349/39 |
| 6,707,523 B2 * | 3/2004 | Oota et al. ............... 349/141 |
| 6,738,108 B2 * | 5/2004 | Ohta et al. ............... 349/39 |
| 7,105,905 B2 * | 9/2006 | Matsunaga et al. ............... 257/435 |

FOREIGN PATENT DOCUMENTS

| | | |
|---|---|---|
| JP | 2002-228492 | 8/2001 |
| JP | 2003-66487 | 3/2003 |
| JP | 2004-151546 | 5/2004 |
| JP | 2004-271903 | 9/2004 |

* cited by examiner

*Primary Examiner*—Brian M Healy
(74) *Attorney, Agent, or Firm*—Dickstein, Shapiro, LLP.

(57) ABSTRACT

A TFT array substrate is provided with an auxiliary capacitance that has a plurality of lower electrodes disposed for each pixel in the row and column directions below a pixel TFT and connected to the drain area of the corresponding pixel TFT. The distances L1 and L2 between separation areas formed between the lower electrodes adjacent in the row direction and the channel areas of the two pixel TFTs that correspond to the lower electrodes are substantially equal to each other. The distances L3 and L4 between separation areas formed between the lower electrodes adjacent in the column direction and the channel areas of the two pixel TFTs that correspond to the lower electrodes are substantially equal to each other. Furthermore, an upper electrode is disposed above the separation areas.

39 Claims, 7 Drawing Sheets

THIN-FILM TRANSISTOR ARRAY SUBSTRATE AND LIQUID CRYSTAL DISPLAY DEVICE

BACKGROUND OF THE INVENTION

1. Field of the Invention

The present invention relates to a thin-film transistor array substrate used in liquid crystal displays and to a liquid crystal display device which has the thin-film transistor array substrate and in which the operation of pixels is controlled using a thin-film transistor.

2. Description of the Related Art

Conventionally known are active matrix liquid crystal display devices in which thin-film transistors (TFT) are used as switching devices. In recent years, there is an increasing need for higher definition in liquid crystal display devices in conjunction with the increased amount of displayed information, and there is also an increasing need for miniaturization in order to allow such devices to be used in portable terminal equipment. For this reason, advancements are being made to increase the density of pixels by increasing the pattern definition in liquid crystal display devices. There is also a need for greater brightness in the display screen, and efforts have been made to raise the light utilization ratio and improve the aperture ratio of the pixels by increasing pattern definition in order to meet this need.

An active matrix liquid crystal display device carries out display operations by accumulating a prescribed charge in a pixel capacitance composed of a liquid crystal layer and transparent electrodes that are formed on both sides of the liquid crystal layer. However, active matrix liquid crystal display devices have a drawback in that the charge accumulated in the pixel capacitance fluctuates due a leak current produced in the pixel TFT that controls the pixel operation, and the display quality is degraded. One type of leak current produced in the pixel TFT is an optical leak current that is produced by excitation with light incident on the pixel TFT and generation of carriers. In order to reduce the optical leak current, a known method forms a light-blocking film so that light does not reach the channel area of the pixel TFT.

Also known is a method that reduces the effect of leak current by providing an auxiliary capacitance in parallel with the pixel capacitance, and liquid crystal display devices with a structure provided with an auxiliary capacitance below the pixel TFT are disclosed in prior art (refer to Japanese Laid-Open Patent Applications 2003-66487, 2001-228492, and 2004-271903, for example). FIG. 1 is a cross-sectional diagram showing the TFT array substrate of the liquid crystal display described in Japanese Laid-Open Patent Application 2003-66487. FIG. 1 shows the structure of a single pixel. The TFT array substrate 100 in the liquid crystal display device is configured so that a lower electrode 102 is separated in pixel units and formed as islands on the transparent substrate 101, as shown in FIG. 1, and an upper electrode 105 is formed on the top surface of the lower electrode 102 via a dielectric film 104. The auxiliary capacitance 124 is composed of an upper electrode 105, a dielectric film 104, and a lower electrode 102, and an interlayer insulating film 106 is formed so as to cover the auxiliary capacitance 124. The upper electrode 105 is connected to the upper electrodes of the adjacent pixels.

A semiconductor film 107 is formed in the area above the lower electrode 102 on the interlayer insulating film 106, and the lower electrode 102 and semiconductor film 107 are connected to each other by way of a connecting electrode 126 formed in the contact hole 121 provided in the interlayer insulating film 106. A gate line 109 is formed in the semiconductor film 107 in the area above the upper electrode 105 by way of a gate insulating film 108, and the semiconductor film 107, gate insulating film 108, and gate line 109 constitute a pixel TFT 131. In this manner, the auxiliary capacitance 124 is disposed below the pixel TFT 131 in the TFT array substrate 100.

An interlayer insulating film 110 is formed so as to cover the pixel TFT 131, and a data line 111 is formed on the interlayer insulating film 110. An interlayer insulating film 112 is furthermore formed so as to cover the interlayer insulating film 110 and data line 111, and a pixel electrode 113 is formed on the interlayer insulating film 112. The data line 111 is connected to the semiconductor film 107 of the pixel TFT 131 via a contact hole 122 provided in the interlayer insulating film 110. The pixel electrode 113 is connected to the semiconductor film 107 via a contact hole 123 formed in a continuous fashion in the interlayer insulating films 110 and 112.

FIG. 2 is a cross-sectional diagram showing the TFT array substrate of the liquid crystal display device described in Japanese Laid-open Patent Application No. 2001-228492. The structure of a single pixel is shown in FIG. 2. The same reference numerals are assigned to the same components as the constituent elements of the TFT array substrate shown in FIG. 1, and a detailed description thereof is omitted. The TFT array substrate 130 in the liquid crystal display device described in Japanese Laid-Open Patent Application No. 2003-66487 (pp. 4-5, FIG. 1) is configured so that a lower electrode 102 is formed on the transparent substrate 101, as shown in FIG. 2, and the upper electrode 135 is separated in pixel units and formed as islands on the lower electrode 102 via a dielectric film 134. The upper electrode 135 and a semiconductor film 107 are connected to each other by way of a contact hole 141. A connection is established between an auxiliary capacitance 144 composed of the lower electrode 102, dielectric film 134, and upper electrode 135, and a pixel TFT 131 composed of the semiconductor film 107, gate insulating film 108, and gate line 109. The configuration other than that described above in the TFT array substrate 130 is the same as the TFT array substrate 100 shown in FIG. 1.

The conventional TFT array substrates shown in FIGS. 1 and 2 are configured so that only the upper electrode, or both the upper and lower electrodes are formed from light-blocking material, thereby allowing the amount of light that enters from the transparent substrate side and irradiates the channel area (not shown) of the pixel TFT to be reduced, and thereby allowing the leak current in the pixel TFT to be reduced. The area that is not transparent to light can be reduced and the aperture ratio can be inhibited in its ability to decrease by disposing an auxiliary capacitance below the TFT array substrate.

Also proposed in the prior art is a TFT array substrate whose light-blocking characteristics are improved by disposing an auxiliary capacitance below the pixel TFT and disposing a light-blocking layer so as to cover the channel area of the pixel TFT (Japanese Laid-Open Patent Application No. 2004-151546, for example).

However, the above-described prior art has drawbacks that are described below. First, there is a drawback in the liquid crystal display devices described in the above-noted publications in that light entering from the transparent substrate side of the TFT array substrate cannot be sufficiently blocked and the contrast of the display screen is inadequate. In the case of the liquid crystal display device described in Japanese Laid-Open Patent Application No.

2003-66487, for example, the lower electrode 102 must be formed as islands in pixel units in order to allow the auxiliary capacitance 124 to function, as shown in FIG. 1, and even if the lower electrode 102 is formed from light-blocking material, light that enters from the reverse side of the TFT array substrate 100, that is, the transparent substrate 101 side, passes through the area between the separately formed lower electrodes 102 and irradiates the channel area of the pixel TFT 131.

In the case of the liquid crystal display device described in Japanese Laid-Open Patent Application No. 2001-228492, for example, the upper electrode 135 must be formed as islands in a pixel units in order allow the auxiliary capacitance 144 to function, as shown in FIG. 2. For this reason, even if the upper electrode 135 is formed from a light-absorbing semiconductor film and the lower electrode 102 is formed from a light blocking metal film, sufficient light-absorbing effect cannot be obtained in the area between the separately formed upper electrodes 135, and light that enters from the reverse side of the TFT array substrate 130, that is, the transparent substrate 101 side, cannot be adequately prevented from irradiating the channel area of the pixel TFT 131.

The light that enters from the front side of the TFT array substrate is ordinarily blocked by a blocking film (black matrix) formed on the TFT array substrate or on the opposing substrate that is disposed facing the TFT array substrate. As described above, however, higher pattern definition is being used in recent years in order to increase pixel density and to make the display screen brighter, but this approach results in a thin and positionally displaced pattern, and it is becoming difficult to completely block incident light at certain incident angles. This problem similarly applies to the liquid crystal display device described in Japanese Laid-Open Patent Application No. 2004-151546 (pp. 5 to 8, FIG. 1). Furthermore, the light that enters from the reverse side of the TFT array substrate is reflected by the black matrix, and there are cases in which the reflected light is directed from the front side of the TFT array substrate 100 to the pixel TFT.

SUMMARY OF THE INVENTION

An object of the present invention is to provide a thin-film transistor array substrate and a liquid crystal display device that can prevent light from entering the TFT array substrate and irradiating the channel area of the pixel TFT, and that can control the loss of contrast in the display screen.

The thin-film transistor array substrate according to the first aspect of the present invention has an optically transparent substrate, an auxiliary capacitance formed for each pixel on the optically transparent substrate, and a thin-film transistor formed for each pixel above the auxiliary capacitance, wherein the auxiliary capacitance comprises a plurality of lower electrodes disposed for each pixel in the row and column directions, a dielectric film formed so as to cover the lower electrodes, and an upper electrode formed on the dielectric film with at least a portion thereof disposed in the area above the lower electrodes, wherein the lower electrodes are connected with the thin-film transistor, and wherein a separation area between the lower electrodes that are adjacent in at least one direction selected from the row direction and the column direction is equidistant from two thin-film transistors that correspond to the lower electrodes.

In the present invention, the separation area between the lower electrodes that are adjacent in at least one direction selected from the row direction and the column direction is formed in a position that is equidistant from the two thin-film transistors that correspond to the lower electrodes, and the distance between the separation area and the channel area of the thin-film transistor is made as great as possible. Therefore, the amount of light that enters the thin-film transistor array substrate and reaches the channel area is reduced, and the loss of contrast in the display screen can be controlled.

The thin-film transistor array substrate may be provided with an upper electrode above the separation area. Since the light that passes through the separation area can be blocked by the upper electrode, the amount of light that reaches the channel area can be reduced.

The thin-film transistor array substrate according to the second aspect of the present invention has an optically transparent substrate, an auxiliary capacitance formed for each pixel on the optically transparent substrate, and a thin-film transistor formed for each pixel above the auxiliary capacitance, wherein the auxiliary capacitance comprises a lower electrode, a dielectric film formed so as to cover the lower electrode, and a plurality of upper electrodes disposed for each pixel in the row and column directions and formed in the area above the lower electrode on the dielectric film, wherein the upper electrodes are connected to the thin-film transistor, and wherein a separation area between the upper electrodes that are adjacent in at least one direction selected from the row direction and the column direction is equidistant from two thin-film transistors that correspond to the upper electrodes.

In the present invention, the separation area between the upper electrodes adjacent in at least one direction selected from the row direction and the column direction is formed in a position equidistant from the two thin-film transistors that correspond to the upper electrodes, and the distance between the separation area and the channel area of the thin-film transistor is made as great as possible. Therefore, the amount of light that enters the thin-film transistor array substrate and reaches the channel area is reduced and the loss of contrast in the display screen can be controlled.

The thin-film transistor array substrate may be configured with the lower electrode disposed below the separation area. Since the light that enters from the optically transparent substrate side toward the separation area is thereby blocked by the lower electrode, the amount of light that reaches the channel area can be reduced.

The thin-film transistor array substrate according to the third aspect of the present invention has an optically transparent substrate, an auxiliary capacitance formed for each pixel on the optically transparent substrate, and a thin-film transistor formed for each pixel above the auxiliary capacitance, wherein the auxiliary capacitance comprises a plurality of lower electrodes disposed for each pixel in the row and column directions, a dielectric film formed so as to cover the lower electrodes, and an upper electrode formed on the dielectric film with at least a portion thereof disposed in the area above the lower electrodes, and wherein the lower electrodes are connected to the thin-film transistor, and the upper electrode is disposed above the separation area.

In the present invention, since the upper electrode is disposed above the separation area, the light that passes through the separation area can be blocked by the upper electrode. The amount of light that reaches the channel area is thereby reduced, and the loss of contrast in the display screen can be controlled.

The thin-film transistor array substrate according to the fourth aspect of the present invention has an optically transparent substrate, an auxiliary capacitance formed for each pixel on the optically transparent substrate, and a thin-film transistor formed for each pixel above the auxiliary capacitance, wherein the auxiliary capacitance comprises a lower electrode, a dielectric film formed so as to cover the lower electrode, and a plurality of upper electrodes disposed for each pixel in the row and column directions and formed in the area above the lower electrodes in the dielectric film, and wherein the upper electrodes are connected to the thin-film transistor, and the lower electrode is disposed below the separation area.

In the present invention, since the upper electrodes are disposed below the separation area, the light that enters from the optically transparent substrate side and travels toward the separation area can be blocked by the lower electrode. The amount of light that reaches the channel area is thereby reduced, and the loss of contrast in the display screen can be controlled.

The distance between the lower electrodes adjacent in at least one direction selected from the row direction and column direction is 1 to 10 µm, for example. The distance between the upper electrodes adjacent in at least one direction selected from the row direction and column direction is 1 to 10 µm, for example. The amount of light that passes through the separation area can thereby be reduced.

Each lower electrode is formed from a material having light-blocking characteristics, for example. Furthermore, each upper electrode is formed from a material having light-blocking characteristics, a material having light-absorbing characteristics, or a laminated film composed of a film having a material having light-blocking characteristics and a material having light-absorbing characteristics, for example. The material having light-absorbing characteristics is silicon or a silicon-containing material, for example.

The liquid crystal display device according to the fifth aspect of the present invention has the thin-film transistor substrate according to any of claims 1 to 13, an opposing substrate disposed facing the thin-film transistor array substrate, and a liquid crystal layer sealed between the thin-film transistor array substrate and the opposing substrate.

In the present invention, since the amount of light that enters the thin-film transistor array substrate and reaches the channel area can be reduced, the loss of contrast in the display screen can be suppressed.

In accordance with the present invention, the separation area between the upper or lower electrodes that are adjacent in at least one direction selected from the row direction and the column direction is formed in a position that is equidistant from two thin-film transistors that correspond to the upper or lower electrodes thereof, and the distance between the separation area and the channel area of the transistors is made as great as possible. Therefore, the amount of light that enters the thin-film transistor array substrate and reaches the channel area can be reduced and the loss of contrast in the display screen can be suppressed. In the case that the separation area is formed between the lower electrodes, an upper electrode is formed thereabove; or in the case that the separation area is formed between the upper electrodes, a lower electrode is formed therebelow. Therefore, the amount of light that enters the thin-film transistor array substrate and reaches the channel area can be reduced, and the loss of contrast in the display screen can be controlled because the light that travels toward the separation can be blocked by the lower or upper electrodes.

BRIEF DESCRIPTION OF THE DRAWINGS

FIGS. 7A and 7B are cross-sectional diagrams showing the same production method of the TFT array substrate of the first embodiment of the present invention in accordance with steps thereof, wherein FIG. 7A shows the step subsequent to FIG. 6C;

FIGS. 10A and 10B are cross-sectional diagrams showing the operation of the TFT array substrate of the second embodiment of the present invention, wherein FIG. 10A is a cross-sectional view along the line B-B shown in FIG. 9, and FIG. 10B is a cross-sectional view along the line C-C shown in FIG. 9.

DETAILED DESCRIPTION OF THE PREFERRED EMBODIMENTS

Figure 1:
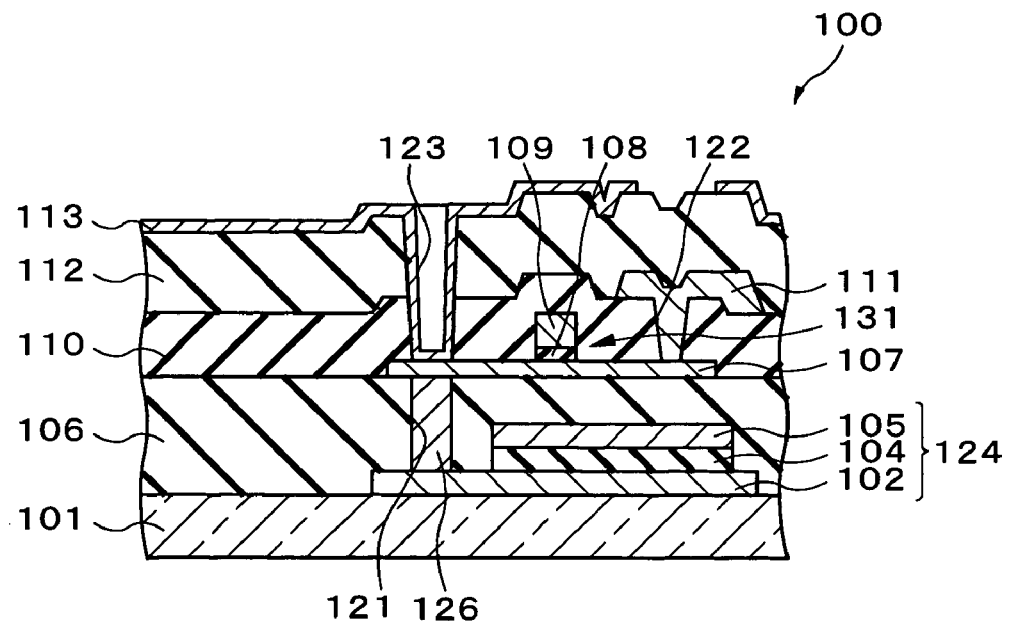
FIG. 1 is a cross-sectional diagram showing a conventional TFT array substrate described in Japanese Laid-Open Patent Application No. 2003-66487 (pp. 4-5, FIG. 1)
Figure 2:
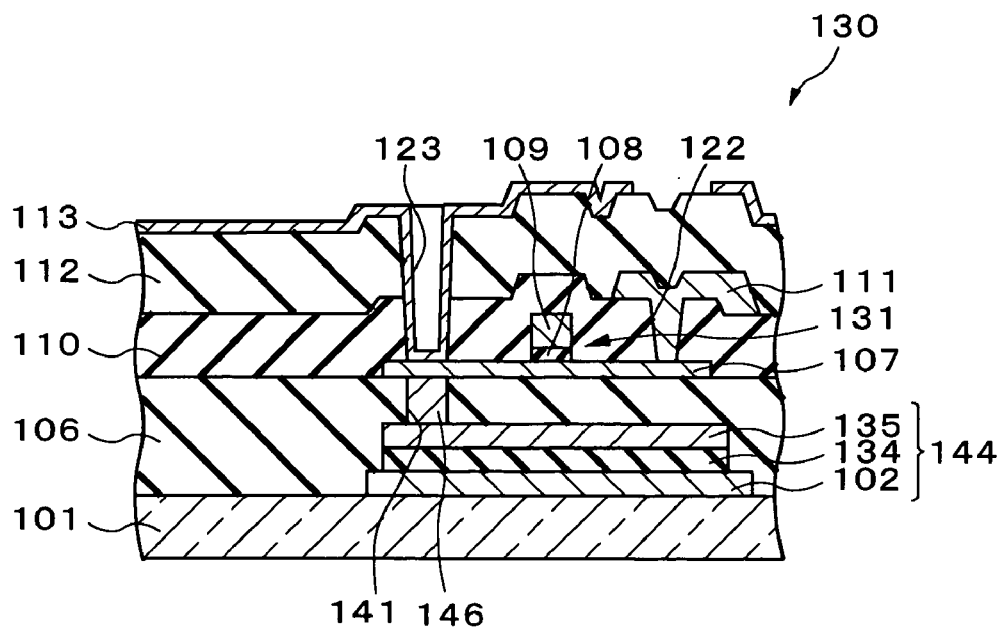
FIG. 2 is a cross-sectional diagram showing a conventional TFT array substrate described in Japanese Laid-Open Patent Application No. 2001-228492 (p. 5, FIG. 1)
Figure 3:
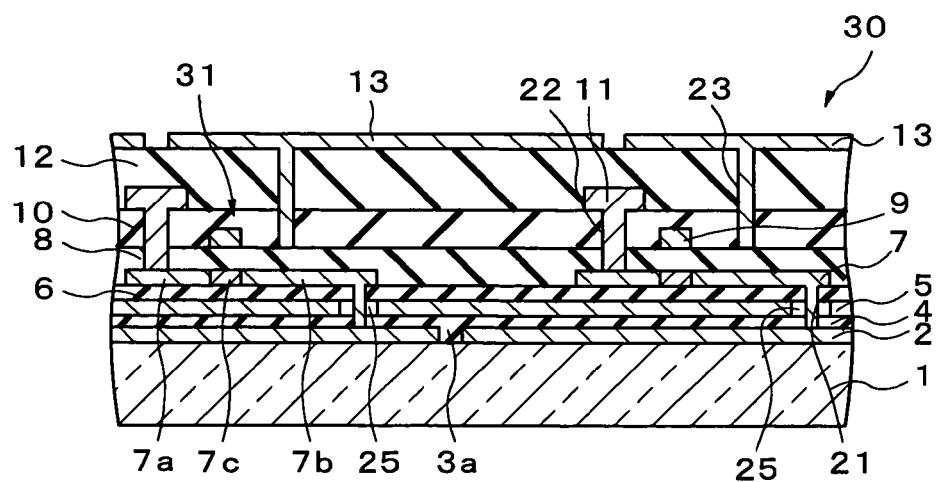
FIG. 3 is a cross-sectional diagram showing the configuration of the TFT array substrate of the first embodiment of the present invention.
Figure 4:
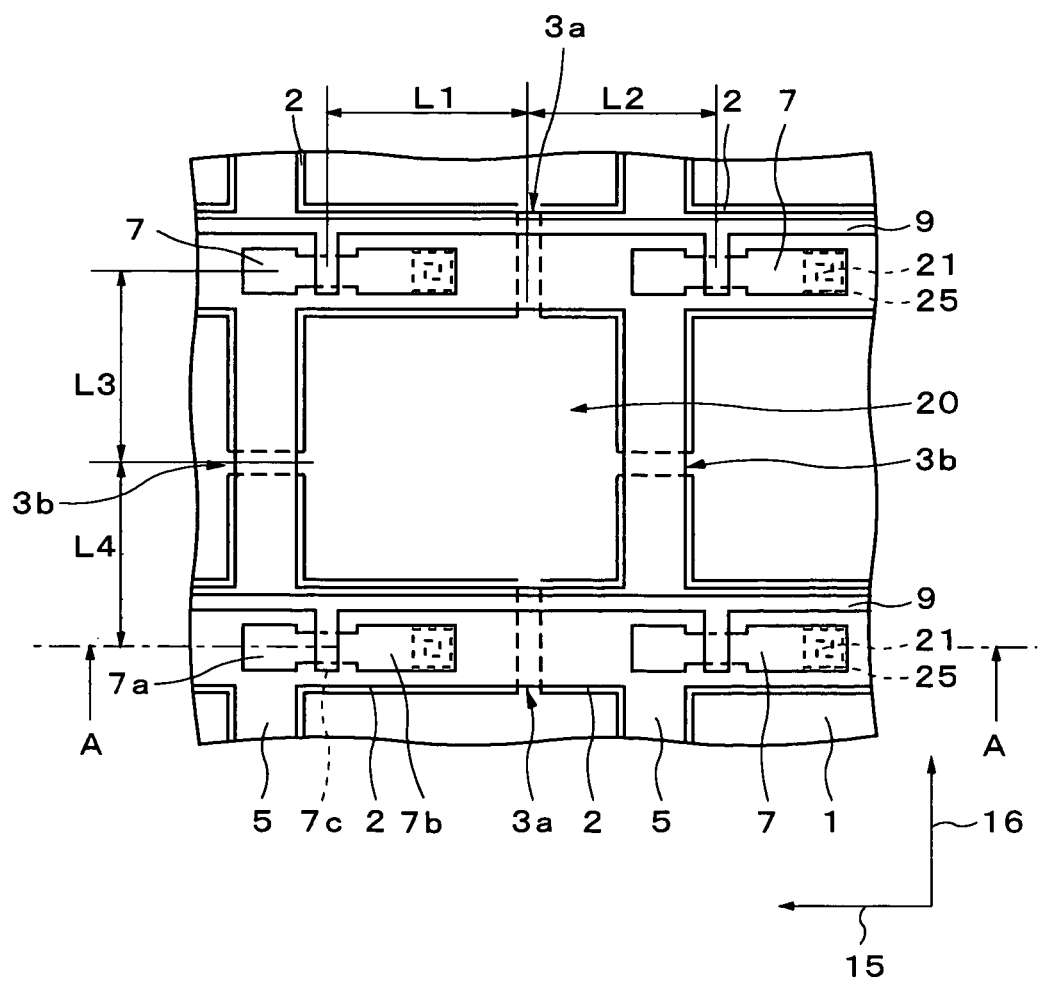
FIG. 4 is a top view showing the configuration of the layers below the interlayer insulating film 10 in the TFT array substrate 30 shown in FIG. 3.

The thin-film transistor array substrate of the embodiments of the present invention is described in detail below with reference to the attached diagrams. Described first is the TFT array substrate of the first embodiment of the present invention. FIG. 3 is a cross-sectional diagram showing the configuration of the TFT array substrate of the present embodiment, and FIG. 4 is a top view showing the configuration of the layers below the interlayer insulating film 10. FIG. 3 corresponds to a cross-sectional diagram along the line A-A shown in FIG. 4. FIGS. 3 and 4 show the configuration of a single pixel and the configuration of a portion of the pixels adjacent thereto, and the same applies to the diagrams following thereinafter. In FIG. 4, the gate insulating film 8, interlayer insulating film 6, and dielectric film 4 are omitted in order to simplify the diagram. The TFT array substrate 30 of the present embodiment is composed of tungsten, molybdenum, or another material having low optical transmittance on an optically transparent substrate 1 that is composed of glass or another insulating and light-transmitting material. A plurality of lower electrodes 2 in the form of a cross as viewed from above are formed along the row direction 15 and column direction 16, as shown in FIGS. 3 and 4. The lower electrodes 2 are arranged so that the overall configuration is substantially in the form a lattice with a prescribed interval provided between the adjacent lower electrodes 2.

Thus, in the TFT array substrate 30 of the present embodiment, separation areas 3a and 3b are formed between the lower electrodes 2 adjacent in the row direction 15 and the lower electrodes 2 adjacent in the column direction 16, respectively, to electrically separate the adjacent lower electrodes 2 from each other. The width of the separation areas 3a and 3b, that is, the distance between two adjacent lower electrodes 2 on both sides of any of the separation areas 3a or 3b, may be the smallest dimension allowed by design standards with consideration given to pattern formation and production yield. The thickness is about 1 to 10 µm, for example. The thickness of the lower electrodes 2 may be one that can sufficiently block light that enters directly from the reverse side of the TFT array substrate 30, that is, the optically transparent substrate 1 side.

A dielectric film 4 is formed on the optically transparent substrate 1 so as to cover the lower electrodes 2. Upper electrodes 5 composed of tungsten, molybdenum, or another material having low optical transmittance, a light absorbing material such as amorphous silicon or the like, or a laminated film composed of these materials are formed in the shape a lattice along the row direction 15 and column direction 16 in the area above the separation areas 3a and 3b as well as the lower electrodes 2 on the dielectric film 4. An auxiliary capacitance 24 is composed of the lower electrodes 2, upper electrodes 5, and dielectric film 4 disposed therebetween. The upper electrodes 5 are connected to the upper electrodes 5 of the adjacent pixels, and are connected to a power line having a prescribed constant electric potential in the peripheral portion of the TFT array substrate 30.

An interlayer insulating film 6 is formed on the dielectric film 4 so as to cover the upper electrodes 5, and a plurality of semiconductor films 7 composed of polysilicon film or amorphous silicon film are formed as a matrix in the area above the lower electrodes 2 and upper electrodes 5 on the interlayer insulating film 6. A channel area 7c undoped with an impurity or doped with a low concentration of an impurity is formed in the semiconductor films 7, and a source area 7a and drain area 7b doped with a high concentration of an impurity are formed on both sides of the channel area 7c. These components function as the active layer of the pixel TFT 31. An open portion 25 is provided in a portion of the area below the drain area in the upper electrode 5, the drain area 7b and the lower electrodes 2 formed therebelow are electrically connected via a contact hole 21 that is provided inside the open portion 25 and is formed completely through the interlayer insulating film 6 and dielectric film 4. Since the contact hole 21 is formed in the open portion 25 provided in the upper electrodes 5, the semiconductor films 7 and upper electrodes 5 do not make electrical contact. An LDD (Lightly Doped Drain) area (not shown) doped with a low concentration of an impurity may be formed between the channel area 7c and the source area 7a, or between the channel area 7c and drain area 7b.

A gate insulating film 8 is formed on the interlayer insulating film 6 so as to cover the semiconductor films 7, and a plurality of gate lines 9 composed of a polysilicon film, silicide film, metal film, or the like doped with an impurity are formed on the gate insulating film 8. The gate lines 9 are mutually parallel and extend along the row direction 15. Each gate line 9 is disposed so as to overlap with the channel area 7c of the pixel TFTs 31 belonging to the same row, and the lines function as gate electrodes for the pixel TFTs 31.

An interlayer insulating film 10 is formed on the gate insulating film 8 so as to cover the gate lines 9, and a plurality of data lines 11 composed of aluminum film or the like are formed on the interlayer insulating film 10. The data lines 11 are mutually parallel, extend along the column direction 16, and are disposed so as to overlap the semiconductor films 7 of the pixel TFT 31 belonging to the same column. The data lines 11 are electrically connected to the source areas 7a of the semiconductor films 7 formed therebelow, by way of a contact hole 22 that is formed completely through the interlayer insulating film 10 and gate insulating film 8. An interlayer insulating film 12 is formed on the interlayer insulating film 10 so as to cover the data lines 11.

A plurality of pixel electrodes 13 are formed on the interlayer insulating film 12 in a substantially rectangular shape as viewed from above, and the pixel electrodes 13 are disposed in a plurality of pixel areas 20 demarcated by the gate lines 9 and data lines 11. The pixel electrodes 13 are electrically connected to the drain areas 7b of the semiconductor films 7 formed therebelow, by way of a contact hole 23 that is formed completely through the interlayer insulating film 12, interlayer insulating film 10, and gate insulating film 8.

In the TFT array substrate 30 of the present embodiment constituted as described above, the positions in which the separation areas 3a and 3b are formed are set depending on the distance from the channel area 7c. More specifically, in the two channel areas 7c adjacent in the row direction 15 and in the separation area 3a formed therebetween, the distance L1 from the separation area 3a to one of the channel areas 7c and the distance L2 from the separation area to the other channel area 7c are substantially equal, that is, the separation area 3a is disposed in a position in which L1 is approximately equal to L2. Similarly, in the two channel areas 7c adjacent in the column direction 16 and in the separation area 3b formed therebetween, the distance L3 from the separation area 3b to one of the channel areas 7c and the distance L4 from the separation area to the other channel area 7c are substantially equal, in other words, the separation area 3a is disposed in a position in which L3 approximately equal to L4.

Figure 5:
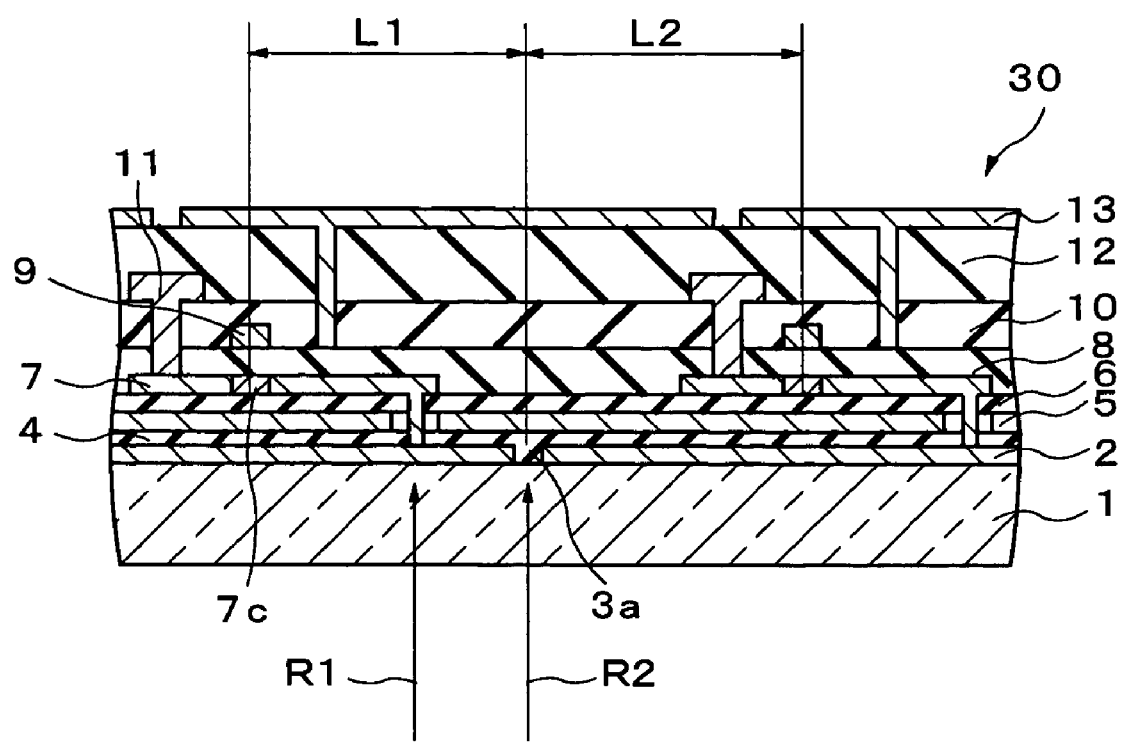
FIG. 5 is a cross-sectional diagram showing the operation of the TFT array substrate of the first embodiment of the present invention.

The operation of the TFT array substrate 30 of the present embodiment is described next. FIG. 5 is a cross-sectional diagram showing the operation of the TFT array substrate 30 of the present embodiment. FIG. 5 corresponds to a cross section along the line A-A shown in FIG. 4. The TFT array substrate 30 of the present embodiment is disposed facing the opposing substrate. A liquid crystal layer is sealed between the TFT array substrate 30 and the opposing substrate to form a liquid crystal display device. In the liquid crystal display device provided with the TFT array substrate 30, light R1 that enters from the reverse side of the TFT array substrate 30, that is, the optically transparent substrate 1 side, and travels toward the lower electrodes 2, as shown in FIG. 5, is blocked by the lower electrodes 2. Light R2 that enters from the reverse side of the TFT array substrate 30 and travels toward the separation areas 3a is blocked or absorbed by the upper electrodes 5 formed above the separation area 3a. In this case, even if a portion of the light R2 that travels toward the separation areas 3a is not blocked or absorbed by the upper electrodes 5, is repeatedly reflected within the TFT array substrate 30, and travels toward any of the channel areas 7c, the amount of light that reaches the channel areas 7c can be reduced in the TFT array substrate 30 because the distances L1 and L2 from the separation areas 3a to the adjacent channel areas 7c are substantially equal to each other, and the distance from the separation areas 3a to the channel areas 7c is made as great as possible. Since the TFT array substrate 30 is configured so that the width of the separation areas 3a, that is, the distance between two adjacent lower electrodes 2 on both sides of each of the separation areas 3a is made to be as short (narrow) as possible, the amount of light R2 that enters from the separation area 3a can be reduced. As a result, the amount of light that reaches the channel areas 7c can be effectively controlled.

In the above description, the operation and effects of the invention were described with particular emphasis on the separation areas 3a, but the same effects can be obtained in the separation areas 3b. In the TFT array substrate 30 of the present embodiment, the distances L1 and L2 between any of the separation areas 3a and the two adjacent channel areas 7c on both sides of the separation area 3a in the row direction 15 are substantially equal to each other (L1≈L2), and the distances L3 and L4 between any of the separation areas 3b and the two adjacent channel areas 7c on both sides of the separation area 3b in the column direction 16 are substantially equal to each other (L3≈L4). However, the present invention is not limited by these options, and the effect of reducing the light that reaches the channel areas 7c can be obtained by making equal any of the distances selected from among the distances L1 and L2 and the distances L3 and L4. Furthermore, the effect of reducing the light that reaches the channel areas 7c can be obtained by making the distances L1 and L2 greater than the minimum value of the width of the lower electrodes 2 in the row direction 15, and making the distances L3 and L4 greater than the minimum value of the width of the lower electrodes 2 in the column direction 16.

In the TFT array substrate 30 of the present embodiment, the upper electrodes 5 are disposed above the separation areas 3a and 3b, but even if the upper electrodes 5 are disposed only above the separation areas 3a or only above the separation areas 3b, the effect of reducing the light that reaches the channel areas 7c can be obtained.

Figure 6A:
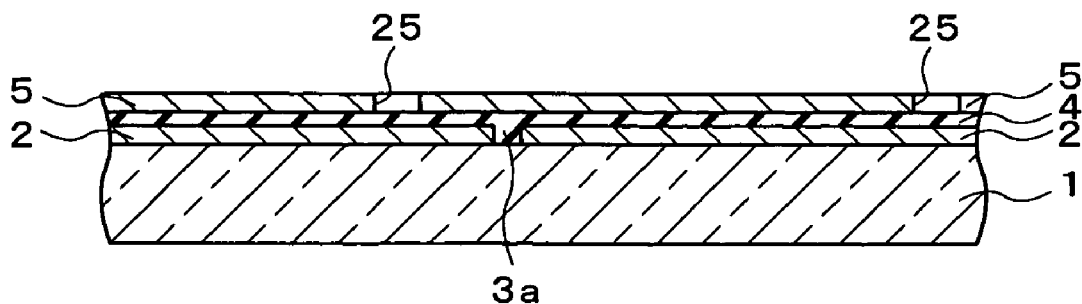
FIGS. 6A to 6C are cross-sectional diagrams showing the production method of the TFT array substrate of the first embodiment of the present invention in accordance with the steps thereof.

Described next is the production method for the TFT array substrate 30 of the present embodiment. FIGS. 6A, 6B, 6C, 7A, and 7B are cross-sectional diagrams showing the production method of the TFT array substrate 30 of the present embodiment in accordance with the steps thereof. FIGS. 6A to 6C, and FIGS. 7A and 7B correspond a cross-sectional diagram along the line A-A shown in FIG. 4. First, a tungsten film is deposited on the surface of the optically transparent substrate 1 by the sputtering method, for example; the tungsten film is patterned by using common photolithographic and etching techniques, and a plurality of lower electrodes 2 are formed so as to be separated from each other by the separation areas 3a and 3b, as shown in FIG. 6A. A dielectric film 4 composed of a silicon oxide film is thereafter deposited on the optically transparent substrate 1 so as to cover the entire set of the lower electrodes 2 by using the CVD (Chemical Vapor Deposition) method. An amorphous silicon film (not shown) is subsequently deposited on the dielectric film 4 by using LPCVD (Low Pressure Chemical Vapor Deposition), PCVD (Plasma Chemical Vapor Deposition), or another deposition method, or a tungsten film (not shown) is deposited by using the sputtering method, and the resulting film is then patterned by using photolithographic and etching techniques to form an upper electrode 5 provided with an open portion 25 and composed of an amorphous silicon film or tungsten film.

Figure 6B:
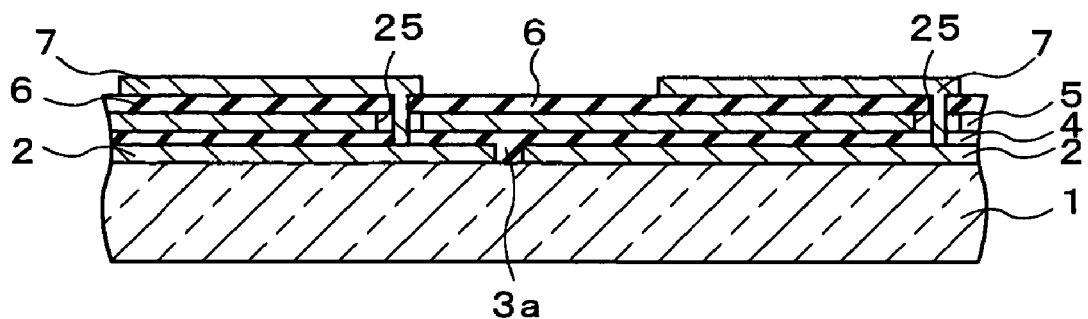

Next, an interlayer insulating film 6 composed of a silicon oxide film is formed on the dielectric film 4 by CVD so as to cover the upper electrode 5, as shown in FIG. 6B. A portion of the lower electrodes 2 is thereafter exposed and contact holes 21 are formed by selectively removing the interlayer insulating film 6 and dielectric film 4 by photolithographic and etching techniques. An amorphous silicon film is subsequently deposited on the interlayer insulating film 6 by LPCVD, PCVD, or another deposition method, and the amorphous silicon film is then crystallized by using laser annealing or another method. A semiconductor film 7 that is composed of a silicon film and functions as an active layer of a pixel TFT 31 is formed on the interlayer insulating film 6 by patterning the crystallized silicon film using photolithographic and etching techniques. In this case, the semiconductor film 7 is also formed inside the contact holes 21 and is electrically connected to the lower electrodes 2.

Figure 6C:
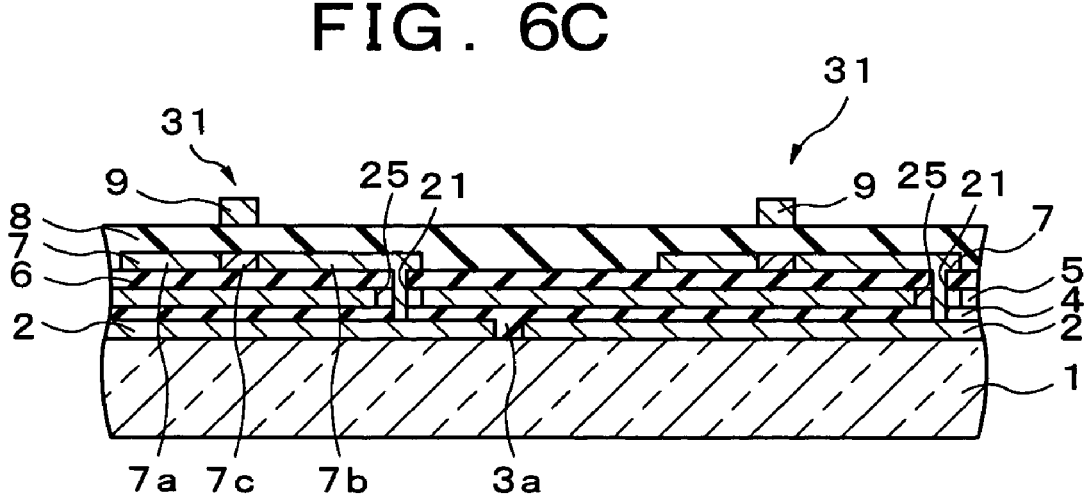

A gate insulating film 8 composed of a silicon oxide film is subsequently formed on the interlayer insulating film 6 by CVD so as to cover the semiconductor film 7, as shown in FIG. 6C. A polysilicon film (not shown) doped with an impurity and a silicide film (not shown) are then formed in sequence on the gate insulating film 8, and a plurality of gate lines 9 composed of a polysilicon film and silicide film are formed by patterning the laminated films using photolithographic and etching techniques. The gate lines 9 are subsequently masked, and the semiconductor film 7 is selectively doped with a high concentration of an impurity to form source areas 7a, channel areas 7c, and drain areas 7b in the semiconductor film 7. Since the areas formed above the contact holes 21 in the semiconductor film 7 are the drain areas 7b, the drain areas 7b and lower electrodes 2 are electrically connected to each other by way of the contact holes 21.

Figure 7A:
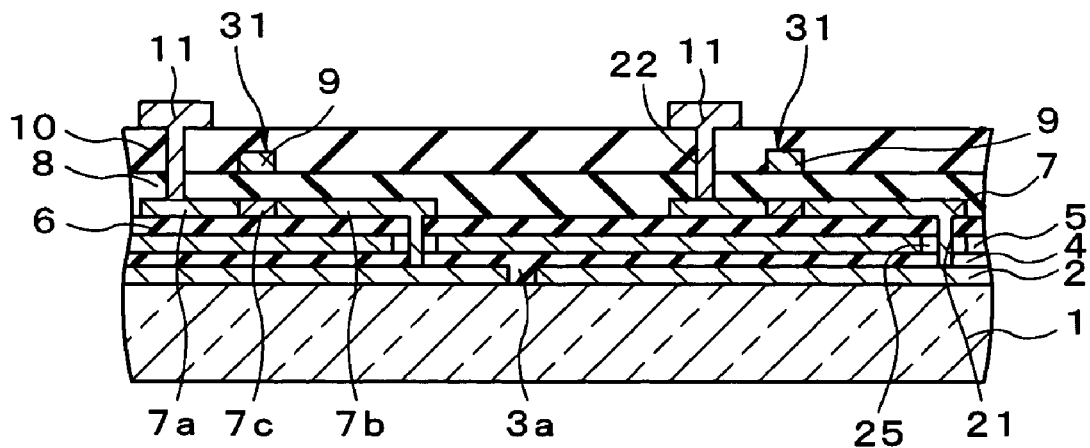

An interlayer insulating film 10 composed of a silicon oxide film is subsequently formed on the gate insulating film 8 by CVD so as to cover the gate lines 9, as shown in FIG. 7A. The source areas 7a of the semiconductor film 7 are thereafter exposed and contact holes 22 are formed by selectively removing the interlayer insulating film 10 and gate insulating film 8 by using photolithographic and etching techniques. An aluminum film is subsequently formed on the interlayer insulating film 10 by sputtering or the like, and a plurality of data lines 11 composed of an aluminum film are then formed by patterning the aluminum film using photolithographic and etching techniques. In this case, the aluminum film, that is, the data lines 11, are also formed inside the contact holes 22, and the data lines 11 and source areas 7a are thereby electrically connected.

Figure 7B:
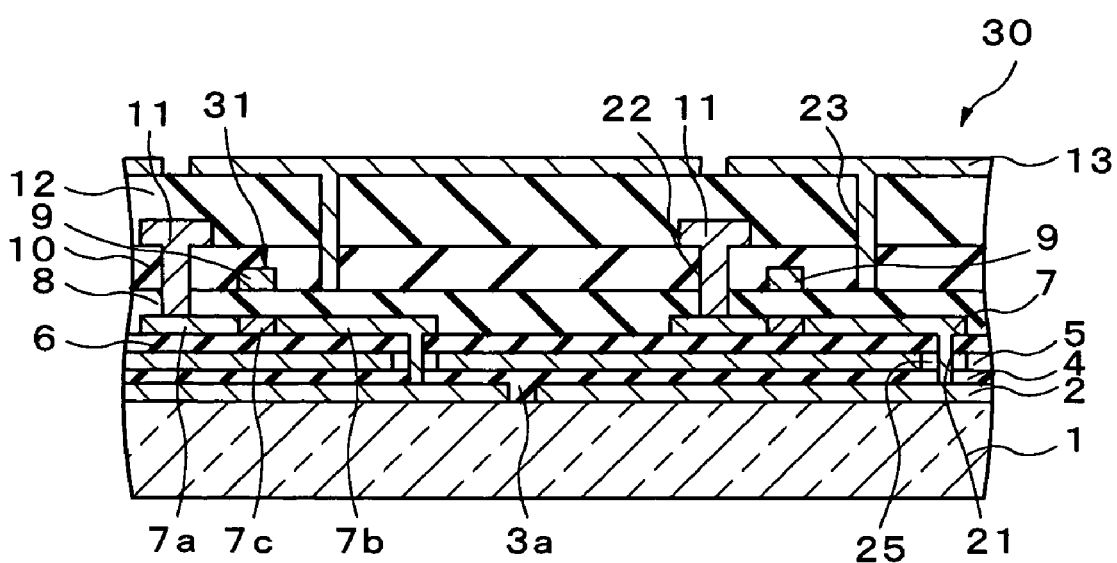

Next, an interlayer insulating film 12 composed of a silicon oxide film is formed on the interlayer insulating film 10 by CVD so as to cover the data lines 11, as shown in FIG. 7B. The drain areas 7b are exposed and contact holes 23 are then formed by selectively removing the interlayer insulating film 12, interlayer insulating film 10, and gate insulating film 8 using photolithographic and etching techniques. Furthermore, an ITO (Indium Tin Oxide is formed on the interlayer insulating film 12, and the ITO film is thereafter patterned by using photolithographic and etching techniques to form a plurality of pixel electrodes 13 composed of the ITO film. The pixel electrodes 13 are also formed inside the contact holes 23, and the pixel electrodes 13 and drain areas 7b are thereby electrically connected. The TFT array substrate 30 shown in FIGS. 3 and 4 is obtained by carrying out the above-described steps.

Figure 8:
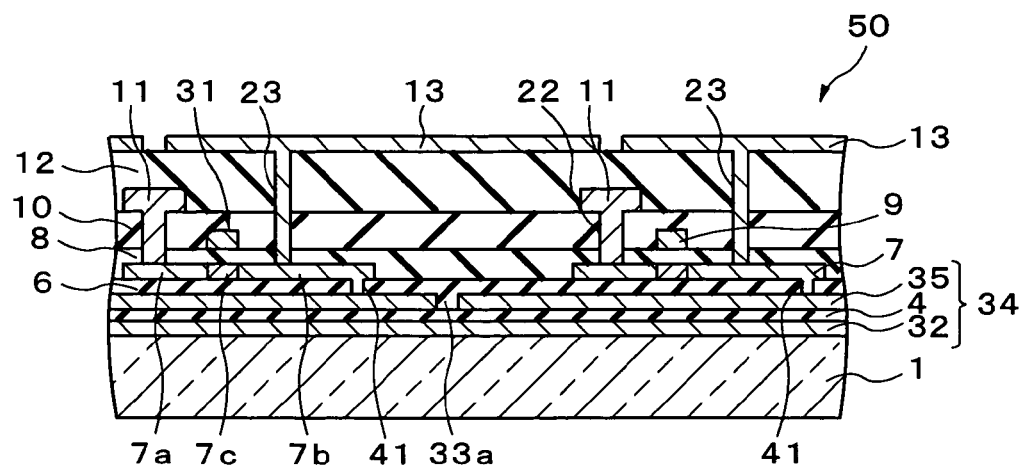
FIG. 8 is a cross-sectional diagram showing the configuration of the TFT array substrate of the second embodiment of the present invention.
Figure 9:
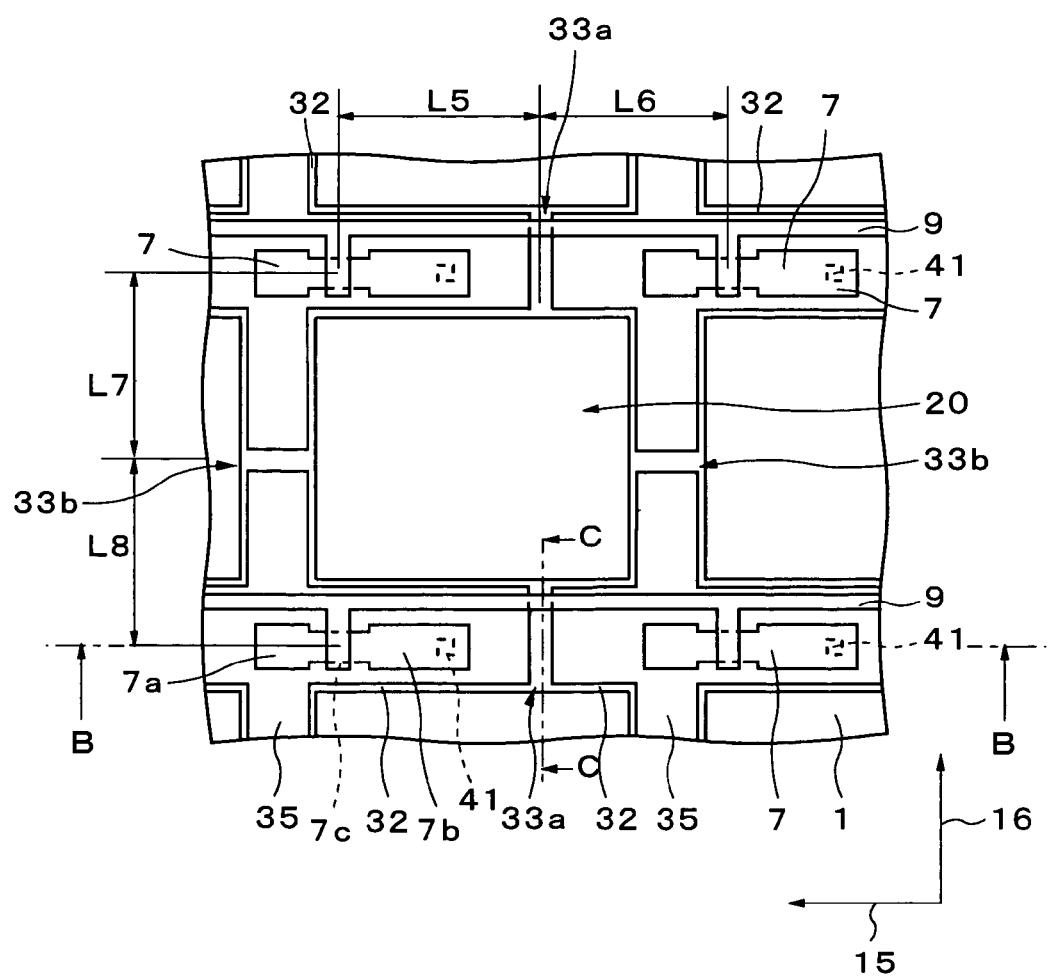
FIG. 9 is a top view showing the configuration of the layers below the interlayer insulating film 10 in the TFT array substrate shown in FIG. 8.

Described next is the TFT array substrate according to the second embodiment of the present invention. FIG. 8 is a cross-sectional diagram showing the TFT array substrate of the present embodiment, and FIG. 9 is a top view showing the configuration of the layers below the interlayer insulating film 10. FIG. 8 corresponds to a cross-sectional diagram along the line B-B shown in FIG. 9. In FIGS. 8 and 9, the same reference numerals are assigned to the same constituent elements of the TFT array substrate 30 shown in FIGS. 3 and 4, and a detailed description if omitted. Furthermore, in FIG. 9, the gate insulating film 8, interlayer insulating film 6, and dielectric film 4 are omitted in order to simplify the diagram. The TFT array substrate 50 has a configuration in which lower electrodes 32 are formed on the optically transparent substrate 1 in the form of a lattice extending along the row direction 15 and column direction 16, as shown in FIGS. 8 and 9. The lower electrodes 32 are formed from tungsten, molybdenum, or another material having low optical transmittance, and the thickness thereof allows light that directly enters from the reverse side of the TFT array substrate 50, that is, the optically transparent substrate 1 side, to be sufficiently blocked. The lower electrodes 32 are connected to the lower electrodes 32 of the adjacent pixels and are connected to a power line having a prescribed constant electric potential in the peripheral area of the TFT array substrate 50.

A dielectric film 4 is formed on the optically transparent substrate 1 so as to cover the lower electrodes 32, and a plurality of upper electrodes 35 composed of an amorphous silicon film that absorbs light is formed in the shape of a cross as viewed from above in the area above the lower electrodes 32 on the dielectric film 4 along the row direction 15 and column direction 16. The upper electrodes 35 are arranged so that the overall configuration is substantially in the form of a lattice with a prescribed interval provided between the adjacent upper electrodes 35. Separation areas 33a and 33b are formed between the adjacent upper electrodes 35 in the row direction 15 and the adjacent upper electrodes 35 in the column direction 16, respectively, and the adjacent upper electrodes 35 are electrically separated from each other. The width of the separation areas 33a and 33b, that is, the distance between two adjacent upper electrodes 35 on both sides of any of the separation areas 33a or 33b may be the smallest dimension allowed by design standards with consideration given to pattern formation and production yield. The thickness is about 1 to 10 µm, for example. The separation areas 33a or 33b are formed in the area above the lower electrodes 32. In the TFT array substrate 50 of the present embodiment, an auxiliary capacitance 34 is composed of the upper electrodes 35, lower electrode 32, and the dielectric film 4 disposed therebetween.

An interlayer insulating film 6 is formed on the dielectric film 4 so as to cover the upper electrodes 35. A plurality of semiconductor films 7 composed of a polysilicon film or amorphous silicon film are formed as a matrix in the area above the lower electrodes 2 on the interlayer insulating film 6. Source areas 7a, drain areas 7b, and channels that function as the active layer of the pixel TFT 31 are formed on the semiconductor film 7, and the drain areas 7b of the semiconductor film 7 are electrically connected to the upper electrodes 35 formed thereabove by way of contact holes 41 formed completely through the interlayer insulating film 6.

In the TFT array substrate 50 of the present embodiment with the configuration described above, the positions in which the separation areas 33a and 33b are formed are set depending on the distance from the channel area 7c. More specifically, in the two channel areas 7c adjacent in the row direction 15 and in the separation area 33a formed therebetween, the distance L5 from the separation area 33a to one of the channel areas 7c and the distance L6 from the separation area to the other channel area 7c are substantially equal, that is, the separation area 33a is disposed in a position in which L5 is approximately equal to L6. Similarly, in the two channel areas 7c adjacent in the column direction 16 and in the separation area 33b formed therebetween, the distance L7 from the separation area 33b to one of the channel areas 7c and the distance L8 from the separation area to the other channel area 7c are substantially equal, in other words, the separation area 33b is disposed in a position in which L7 is approximately equal L8.

Thus, the TFT array substrate 50 of the present embodiment is different from the TFT array substrate 30 of the first embodiment described above in that lower electrodes 32 are formed along the row direction 15 and column direction 16 in the form of a lattice, and in that a plurality of upper electrodes 35 separated by separation areas 33a and 33b are formed above the lower electrodes 32, and the upper electrodes 35 are connected to the semiconductor film. Other elements of the configuration described above are the same as those of the TFT array substrate 30 of the first embodiment described above.

Figure 10A:
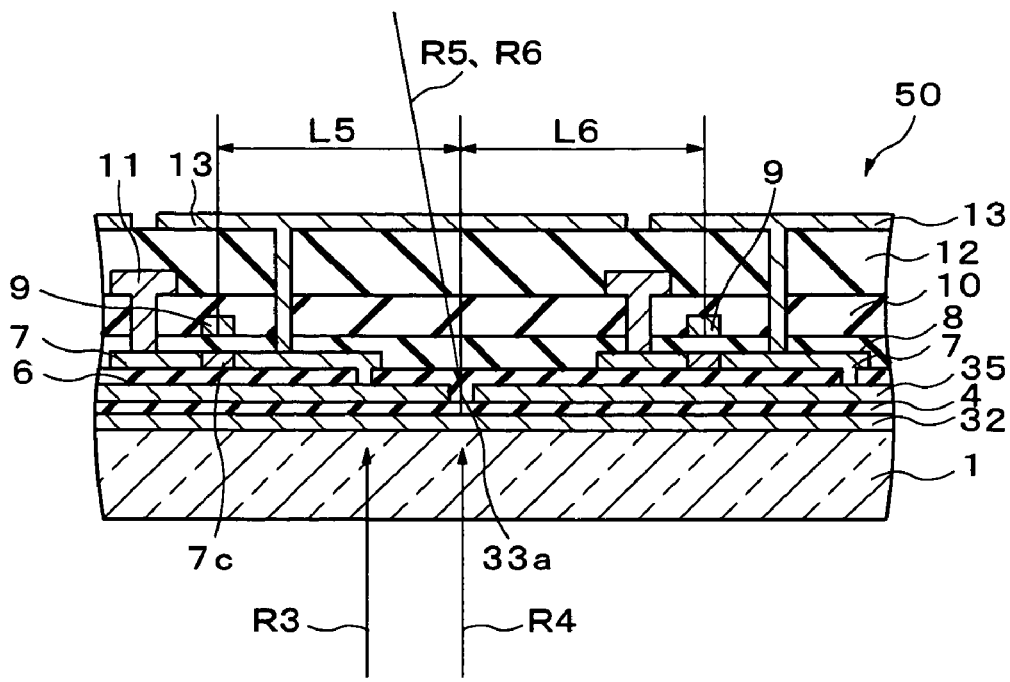
Figure 10B:
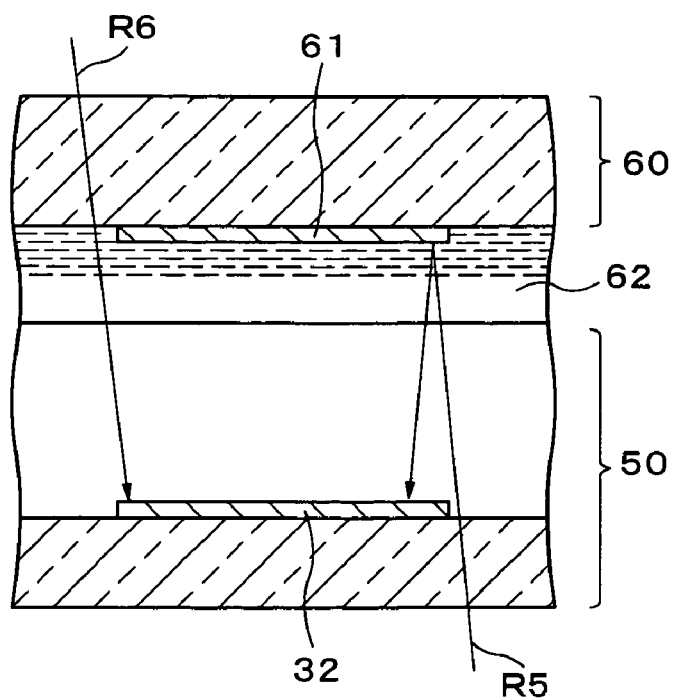

Described next is the operation of the TFT array substrate 50 of the present embodiment. FIGS. 10A and 10B are cross-sectional diagrams showing the operation of the TFT array substrate 50 of the present embodiment, wherein FIG. 10A is a cross-sectional view along the line B-B shown in FIG. 9, and FIG. 10B is a cross-sectional view along the line C-C shown in FIG. 9. The TFT array substrate 50 of the present embodiment, is disposed facing an opposing substrate 60 on which a black matrix 61 is formed, as shown in FIG. 10B. A liquid crystal layer 62 is sealed between the TFT array substrate 50 and the opposing substrate 60 to form a liquid crystal display device. In the liquid crystal display device, light R3 that enters from the reverse side of the TFT array substrate 50, that is, the optically transparent substrate 1 side, and travels toward the lower electrodes 32 is blocked by the lower electrodes 32. Light R4 that enters from the reverse side of the TFT array substrate 50 and travels toward the separation areas 33a is blocked by the lower electrodes 32 formed below the separation areas 33a, that is, the optically transparent substrate 1 side.

Even if light R5 that enters from the reverse side of the TFT array substrate 50 and that is reflected by the black matrix 61 of the opposing substrate 60, and light R6 that enters from the opposing substrate 60 side and that cannot be blocked by the black matrix 61 pass through the separation areas 33a, irradiate the lower electrodes 32, are repeatedly reflected within the TFT array substrate 50, and travel toward any of the channel areas 7c, the amount of light that reaches the channel areas 7c can be reduced in the TFT array substrate 50 of the present embodiment because the distances L5 and L6 from the separation areas 33a to the adjacent channel areas 7c are substantially equal to each other, and the distance from the separation area 33a to the channel areas 7c is made as great as possible. Since the TFT array substrate 50 of the present embodiment is configured so that the width of the separation areas 33a, that is, the distance between two adjacent upper electrodes 35 on both sides of each of the separation areas 33a is made to be as short (narrow) as possible, the amount of light R5 and R6 that enters from the separation areas 33a can be reduced. As a result, the amount of light that reaches the channel areas 7c can be effectively controlled.

In the above description, the operation and effects of the invention are described with particular emphasis on the separation areas 33a, but the same effects can be obtained in the separation areas 33b. In the TFT array substrate 50 of the present embodiment, the distances L5 and L6 between any of the separation areas 33a and the two adjacent channel areas 7c on both sides of the separation area 33a in the row direction 15 are substantially equal to each other (L5≈L6), and the distances L7 and L8 between an of the separation areas 33b and the two adjacent channel areas 7c on both sides of the separation area 33b in the column direction 16 are substantially equal to each other (L7≈L8). However, the present invention is not limited by these options, and the effect of reducing the light that reaches the channel area 7c can be obtained by making equal any of the distances selected from among the distances L5 and L6 and the distances L7 and L8. Furthermore, the effect of reducing the light that reaches the channel areas 7c can be obtained by making the distances L5 and L6 greater than the minimum value of the width of the lower electrodes 32 in the row direction 15, and making the distances L7 and L8 greater than the minimum value of the width of the lower electrodes 32 in the column direction 16.

In the TFT array substrate 50 of the present embodiment, the lower electrodes 32 are disposed below the separation areas 33a and 33b, but even if the lower electrodes 32 are disposed only below the separation areas 33a or only above the separation areas 33b, the effect of reducing the light that reaches the channel areas 7c can be obtained. The TFT array substrate 50 of the present embodiment can be produced with substantially the same production method of the TFT array substrate 30 of the first embodiment described above.

What is claimed is:

1. A thin-film transistor array substrate, comprising:
an optically transparent substrate;
an auxiliary capacitance formed for each pixel on said optically transparent substrate;
a thin-film transistor formed for each pixel above the auxiliary capacitance;
wherein said auxiliary capacitance comprises a plurality of lower electrodes disposed for each pixel in the row and column directions, a dielectric film formed so as to cover said lower electrodes, and an upper electrode formed on the dielectric film with at least a portion thereof disposed above the lower electrodes;
the lower electrodes are connected to said thin-film transistor; and
a separation area between said lower electrodes that are adjacent in at least one direction selected from the row direction and the column direction, said separation area being equidistant from two thin-film transistors that correspond to the lower electrodes thereof.

2. The thin-film transistor array according to claim 1, wherein said upper electrode is disposed above said separation area.

3. A thin-film transistor array substrate, comprising:
an optically transparent substrate;
an auxiliary capacitance formed for each pixel on said optically transparent substrate;
a thin-film transistor formed for each pixel above said auxiliary capacitance;
wherein the auxiliary capacitance comprises a lower electrode, a dielectric film formed so as to cover said lower electrode, and a plurality of upper electrodes disposed for each pixel in the row and column directions and formed above said lower electrode on the dielectric film;
said upper electrodes are connected to said thin-film transistor; and
a separation area between said upper electrodes that are adjacent in at least one direction selected from the row direction and the column direction, said separation area being equidistant from two thin-film transistors that correspond to the upper electrodes thereof.

4. The thin-film transistor array according to claim 3, wherein said lower electrode is disposed below said separation area.

5. A thin-film transistor array substrate, comprising:
an optically transparent substrate;
an auxiliary capacitance formed for each pixel on said optically transparent substrate;
a thin-film transistor formed for each pixel above said auxiliary capacitance;
wherein said auxiliary capacitance comprises a plurality of lower electrodes disposed for each pixel in the row and column directions, a dielectric film formed so as to cover said lower electrodes, and an upper electrode formed on said dielectric film with at least a portion thereof disposed above said lower electrodes;
said lower electrodes are connected to said thin-film transistor;
a separation area between said lower electrodes that are adjacent in at least one direction selected from the row direction and the column direction; and
said upper electrode is disposed above said separation area.

6. A thin-film transistor array substrate, comprising:
an optically transparent substrate;
an auxiliary capacitance formed for each pixel on said optically transparent substrate;
a thin-film transistor formed for each pixel above said auxiliary capacitance;
wherein the auxiliary capacitance comprises a lower electrode, a dielectric film formed so as to cover said lower electrode, and a plurality of upper electrodes disposed for each pixel in the row and column directions and formed above said lower electrodes on said dielectric film;
said upper electrodes are connected to said thin-film transistor;
a separation area between said upper electrodes that are adjacent in at least one direction selected from the row direction and the column direction; and
said lower electrode is disposed below said separation area.

7. The thin-film transistor array according to claim 1, wherein the distance between said lower electrodes adjacent in at least one direction selected from the row direction and column direction is 1 to 10 μm.

8. The thin-film transistor array according to claim 2, wherein the distance between said lower electrodes adjacent in at least one direction selected from the row direction and column direction is 1 to 10 μm.

9. The thin-film transistor array according to claim 5, wherein the distance between said lower electrodes adjacent in at least one direction selected from the row direction and column direction is 1 to 10 μm.

10. The thin-film transistor array according to claim 3, wherein the distance between said upper electrodes adjacent in at least one direction selected from the row direction and column direction is 1 to 10 μm.

11. The thin-film transistor array according to claim 4, wherein the distance between said upper electrodes adjacent in at least one direction selected from the row direction and column direction is 1 to 10 μm.

12. The thin-film transistor array according to claim 6, wherein the distance between said upper electrodes adjacent in at least one direction selected from the row direction and column direction is 1 to 10 μm.

13. The thin-film transistor array according to claim 1, wherein said lower electrode is formed from a material having light-blocking characteristics.

14. The thin-film transistor array according to claim 3, wherein said lower electrode is formed from a material having light-blocking characteristics.

15. The thin-film transistor array according to claim 5, wherein said lower electrode is formed from a material having light-blocking characteristics.

16. The thin-film transistor array according to claim 6, wherein said lower electrode is formed from a material having light-blocking characteristics.

17. The thin-film transistor array according to claim 1, wherein said upper electrode is formed from a material having light-blocking characteristics.

18. The thin-film transistor array according to claim 2, wherein said upper electrode is formed from a material having light-blocking characteristics.

19. The thin-film transistor array according to claim 5, wherein said upper electrode is formed from a material having light-blocking characteristics.

20. The thin-film transistor array according to claim 1, wherein said upper electrode is formed from a material having light-absorbing characteristics.

21. The thin-film transistor array according to claim 3, wherein said upper electrode is formed from a material having light-absorbing characteristics.

22. The thin-film transistor array according to claim 5, wherein said upper electrode is formed from a material having light-absorbing characteristics.

23. The thin-film transistor array according to claim 6, wherein said upper electrode is formed from a material having light-absorbing characteristics.

24. The thin-film transistor array according to claim 1, wherein said upper electrode is a laminated film composed of a film comprising a material having light-blocking characteristics and a material having light-absorbing characteristics.

25. The thin-film transistor array according to claim 3, wherein said upper electrode is a laminated film composed of a film comprising a material having light-blocking characteristics and a material having light-absorbing characteristics.

26. The thin-film transistor array according to claim 5, wherein said upper electrode is a laminated film composed of a film comprising a material having light-blocking characteristics and a material having light-absorbing characteristics.

27. The thin-film transistor array according to claim 6, wherein said upper electrode is a laminated film composed of a film comprising a material having light-blocking characteristics and a material having light-absorbing characteristics.

28. The thin-film transistor array according to claim 20, wherein said material having light-absorbing characteristics is silicon or a silicon-containing material.

29. The thin-film transistor array according to claim 21, wherein said material having light-absorbing characteristics is silicon or a silicon-containing material.

30. The thin-film transistor array according to claim 22, wherein said material having light-absorbing characteristics is silicon or a silicon-containing material.

31. The thin-film transistor array according to claim 23, wherein said material having light-absorbing characteristics is silicon or a silicon-containing material.

32. The thin-film transistor array according to claim 24, wherein said material having light-absorbing characteristics is silicon or a silicon-containing material.

33. The thin-film transistor array according to claim 25, wherein said material having light-absorbing characteristics is silicon or a silicon-containing material.

34. The thin-film transistor array according to claim 26, wherein said material having light-absorbing characteristics is silicon or a silicon-containing material.

35. The thin-film transistor array according to claim 27, wherein said material having light-absorbing characteristics is silicon or a silicon-containing material.

36. A liquid crystal display device having:
   a thin-film transistor substrate according to claim 1; an opposing substrate disposed facing said thin-film transistor array substrate; and
   a liquid crystal layer sealed between said thin-film transistor array substrate and said opposing substrate.

37. A liquid crystal display device having:
   a thin-film transistor substrate according to claim 3;
   an opposing substrate disposed facing said thin-film transistor array substrate; and
   a liquid crystal layer sealed between said thin-film transistor array substrate and said opposing substrate.

38. A liquid crystal display device having:
   a thin-film transistor substrate according to claim 5;
   an opposing substrate disposed facing said thin-film transistor array substrate; and a
   liquid crystal layer sealed between said thin-film transistor array substrate and said opposing substrate.

39. A liquid crystal display device having:
   a thin-film transistor substrate according to claim 6;
   an opposing substrate disposed facing said thin-film transistor array substrate; and
   a liquid crystal layer sealed between said thin-film transistor array substrate and said opposing substrate.

* * * * *